June 23, 1959 H. W. JUST ET AL 2,891,656
CONTROL SYSTEMS FOR MULTI-SECTION LINE MACHINES
Filed April 2, 1956 4 Sheets—Sheet 1

INVENTORS
H.W. JUST
R.F. KIECHOFF
L. PELIKAN
BY J.R. Hall
ATTORNEY

2,891,656

CONTROL SYSTEMS FOR MULTI-SECTION LINE MACHINES

Howard W. Just, Elmwood Park, Raymond F. Kirchoff, Hillside, and Louis Pelikan, Chicago, Ill., assignors to Western Electric Company, Incorporated, New York, N.Y., a corporation of New York Application April 2, 1956, Serial No. 575,621

3 Claims. (Cl. 198—82)

This invention relates to control systems for multi-section line machines, and more particularly to control systems for tandem machines for sequentially twisting lead ends of wires of wire spring relay combs, forming the leads, degreasing the wires, welding contacts on the wires, coining the contacts and bending the wires.

In the operation of machines including a plurality of sections as, for example, machines for making wire spring relay combs, in which the sections are mounted in tandem and articles are fed through the sections one after another, it is essential to run the several sections in synchronism. However, occasionally, if one section needs maintenance, it is desirable to continue automatic operations of the other sections while the section being repaired is shut down or run independently of the operations of the other sections.

An object of the invention is to provide control systems for multi-section line machines.

Another object of the invention is to provide control systems for regulating a plurality of machines arranged in tandem and permitting some of the machines to be run manually while the others are run automatically.

A control system illustrating certain features of the invention may include a selector switch for setting up automatic actuating means of a plurality of machine sections arranged in tandem and manual actuating means of another machine section. Means also are provided for running all the sections automatically in timed relation and all the sections may also be actuated manually.

A complete understanding of the invention may be obtained from the following detailed description of a control system forming a specific embodiment thereof, when read in conjunction with the appended drawings, in which—

Figure 1:
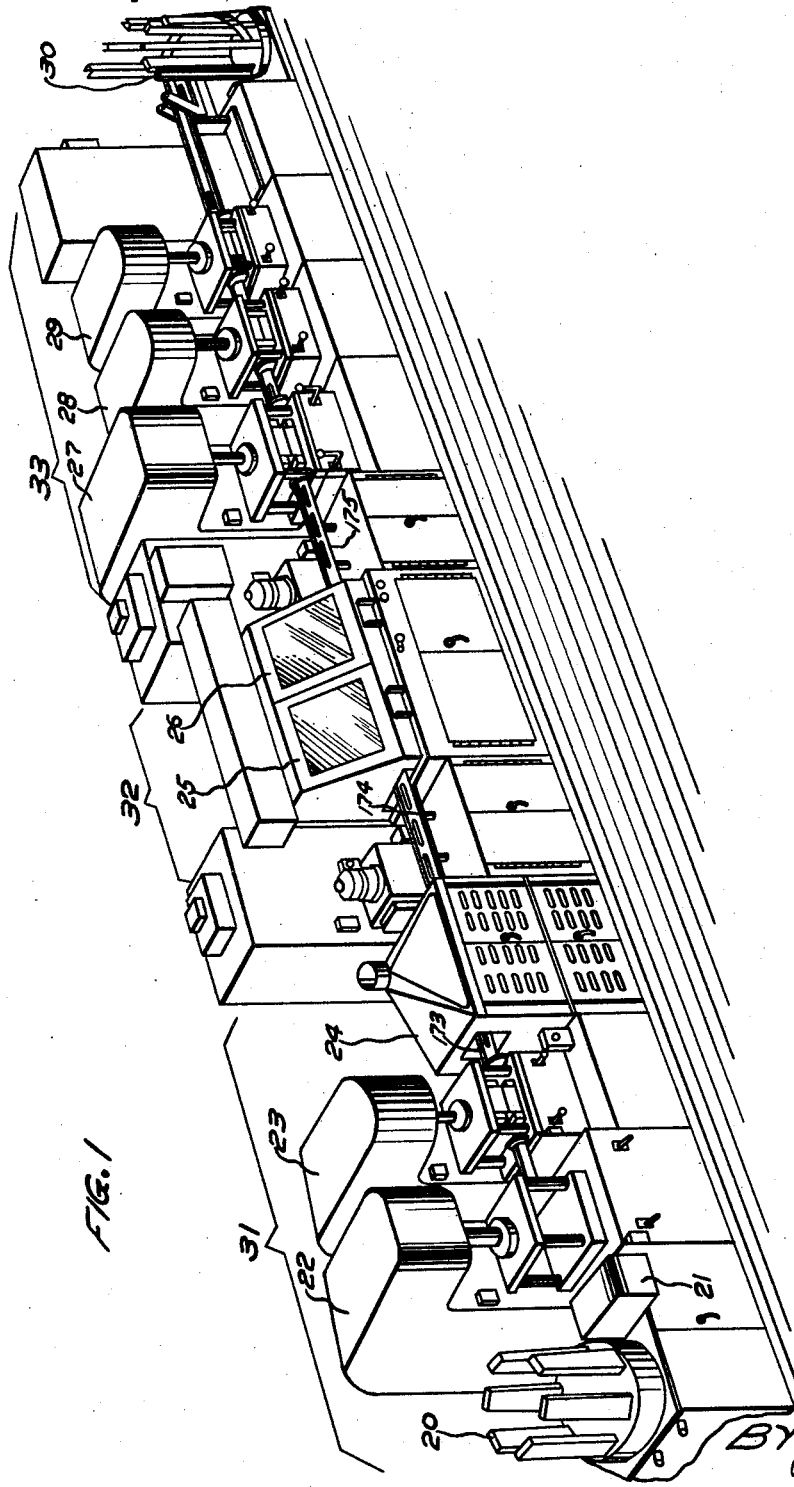
Figure 2:
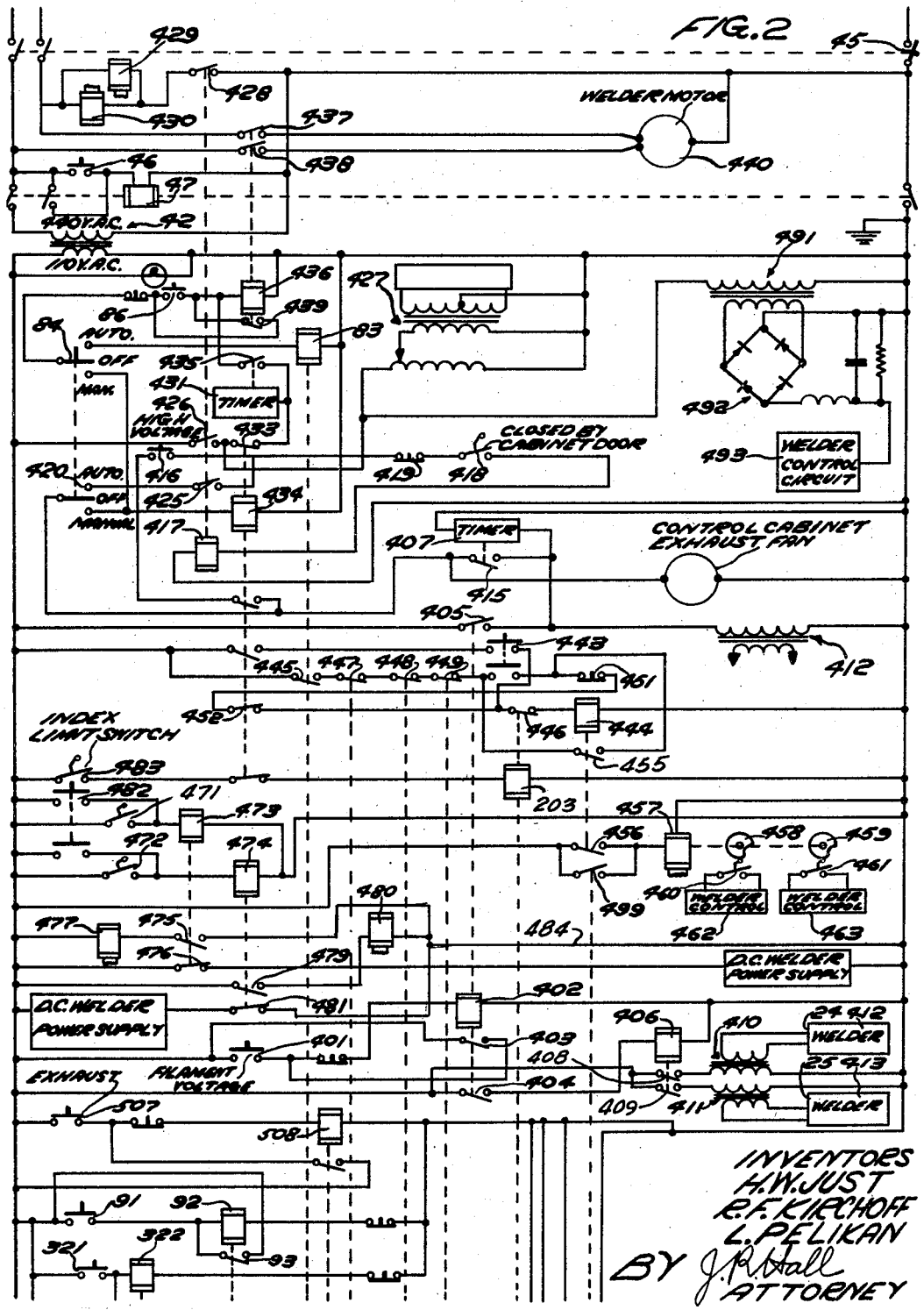
Figure 3:
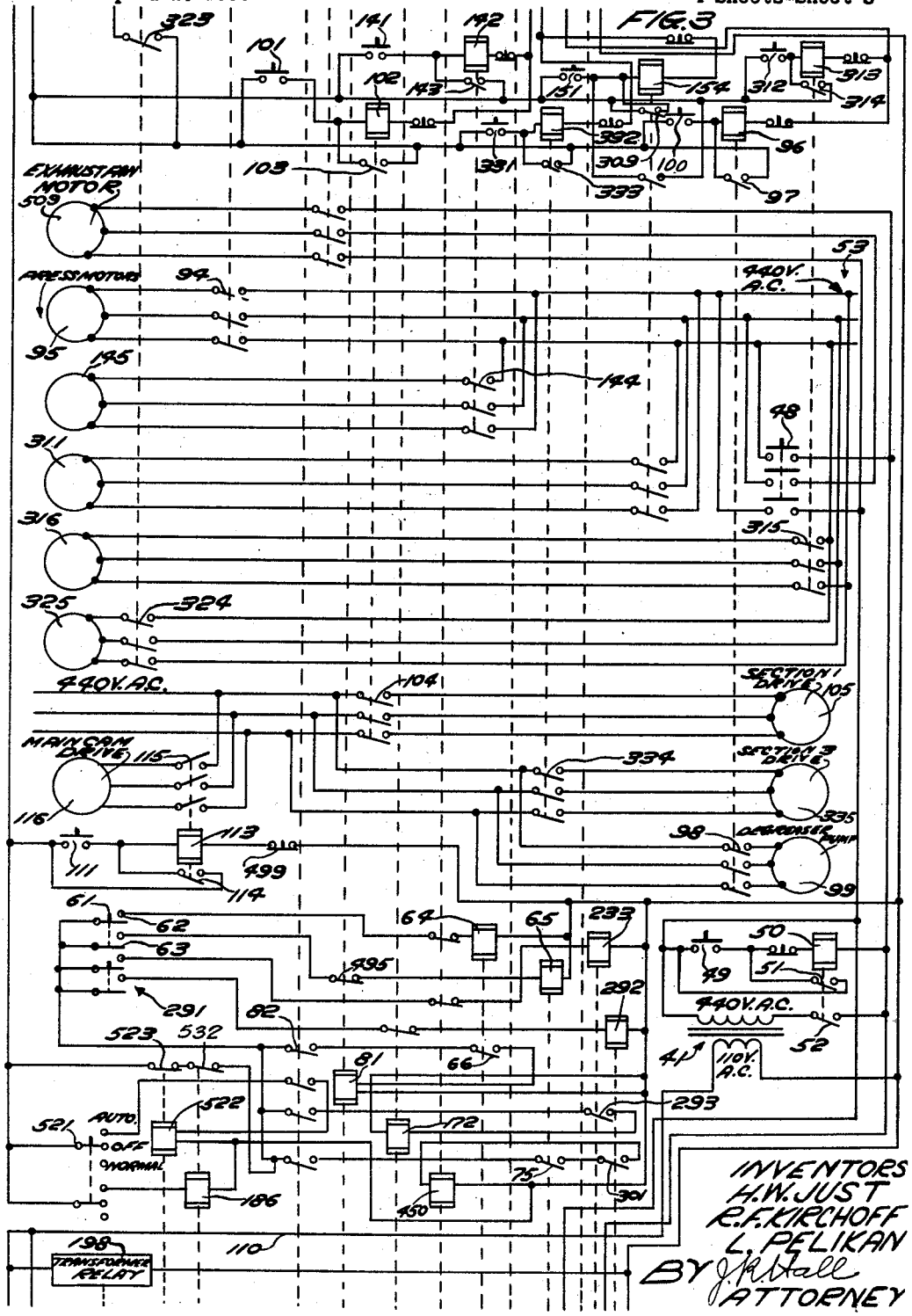
Figure 4:
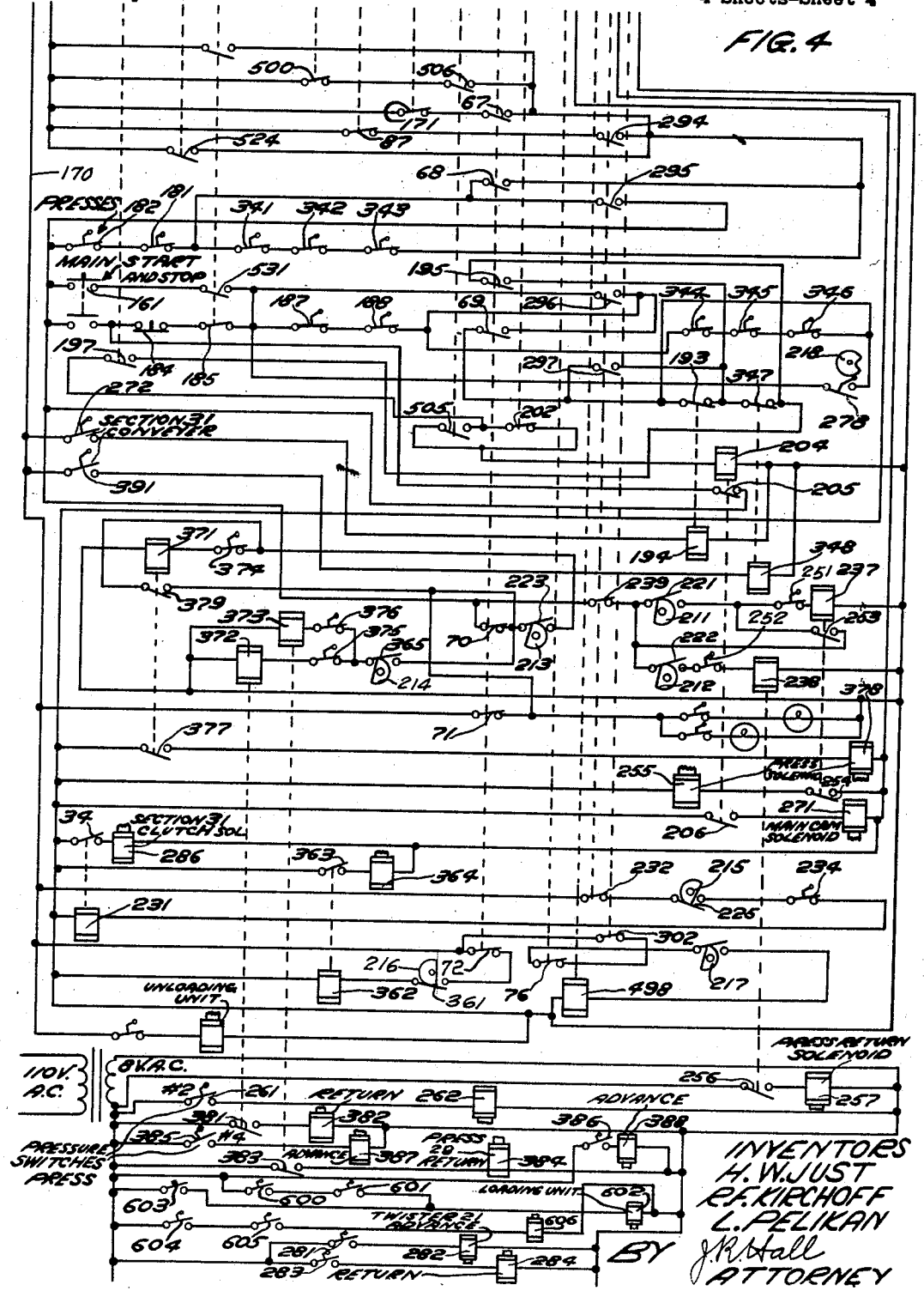

Fig. 1 is a perspective view of an apparatus controlled by a control system forming one embodiment of the invention, and Figs. 2, 3 and 4 are schematic views of a wiring diagram of the control system.

Referring now in detail to the drawings, there is shown an apparatus for automatically feeding wire spring relay combs one at a time from a supply magazine or unloader 20 sequentially to and past a twister 21, presses 22 and 23 for forming lead ends of the combs, a degreaser 24 which degreases the other ends of the comb preparatory to welding contacts on the ends, a first welder 25, a second welder 26 and presses 27, 28 and 29 to a receiving magazine 30. The presses 27, 28 and 29 serve to coin the contacts welded on the contact ends of the wires of the comb and to form the contact ends of the combs into the shape of a Z. The loading magazine 20, the twister 21, the presses 22, 23 and 24 form a section 31 which is operable independently of the other units either automatically or manually in the individual components thereof. The welders 25 and 26 which weld alternate contacts to the wires of the combs form a section 32, which also may be operated independently of the section 31 and of a section 33 comprising the presses 27, 28 and 29 and the unloading magazine 30.

The construction and operation of the unloader 20 and feeding of the combs are disclosed and claimed in copending application Serial No. 465,276, filed October 28, 1954, by C. R. Rasmussen-J. W. Rice for "Reciprocable Feed Mechanism for Advancing Articles," the twister 21 is disclosed in detail and claimed in copending application Serial No. 570,607, filed March 9, 1956, by C. C. McCain-G. Stuhlfauth-B. L. Wright for "Apparatus for Twisting Wires," the welders 25 and 26 are disclosed and claimed in copending application Serial No. 386,742, filed October 19, 1953, now patent No. 2,771,539, by H. A. Myers for "Apparatus for Welding Contacts Onto Wire Spring Relays," and the receiving magazine or stacker 30 is disclosed and claimed in copending application Serial No. 446,312, filed July 28, 1954, now patent No. 2,846,832, by E. W. Larsen-B. L. Wright for "Apparatus for Continous Loading of Articles Into Magazines."

Each of the sections 31, 32 and 33 has an individual drive transfer mechanism for transferring the combs one after another to the several units of each section. The circuit shown in Figs. 2, 3 and 4 controls the operation of the apparatus and permits each of the sections 31, 32 and 33 to be run automatically, either all together or in any other combination.

The section 32 can be run on "manual" through one cycle while either of the other two sections is running on "automatic," but sections 31 and 33 cannot be run on "manual." However, when the switch associated with sections 31 and 33 is in the "off" position each individual component of that section 31 or 33 can be operated by itself except for the twister 21. The sections 31 and 33 are operated with power from a transformer 41 (Fig. 3) while power for section 32 is provided by a Sola transformer 42 (Fig. 2). Power to the section 32 is supplied by closing a power switch 45 and then a momentary switch 46. The closing of the switch 46 energizes contactor 47 to supply power to the transformer 42. Power is supplied to sections 31 and 33 by closing switch 48 (Fig. 3) and then switch 49 to energize a contactor 50 which close holding contacts 51 and contacts 52 to supply power from a power line 53 to the transformer 41.

For operating the section 31 automatically alone, a selector switch 61 closes contacts 62 and 63. This energizes relays 64 and 65. The relay 64 closes contacts 66, 67, 68, 69 and 195 and opens contacts 70, 71 and 72. The relay 65 closes contacts 75 and opens contacts 76. When the contacts 66 of the relay 64 are closed, a relay 81 is energized through the contacts 66 and contacts 82 of a relay 83 (Fig. 2) which is previously energized by turning a switch 84 to its automatic position and closing contacts 86. The relay 81 opens contacts 87 (Fig. 4) and 447 (Fig. 2) to block automatic operation of the sections 32 and 33. A switch 91 is closed to energize a contactor 92 to close holding contacts 93 and close contacts 94 (Fig. 3) to start a pump motor 95 to build up pressure in the hydraulic operating system of the press 22. Switch 100 is then closed to energize a relay 96 to close holding contacts 97 and contacts 98 to energize a pump motor 99 of the degreaser 24. A switch 101 is closed to energize a relay 102 to close holding contacts 103, and also close contacts 104 to energize a motor 105 for driving the transfer mechanism of the section 31.

Momentary switch 111 is closed to energize contactor 113 to close holding contacts 114 and contacts 115 to energize a motor 116 which drives the main cam shaft of the machine. This supplies power through a clutch to cams 211 through 218 (Fig. 4). Switch 141 (Fig. 3) is closed to energize contactor 142 which locks itself in through contacts 143 and closes contacts 144 to energize motor 145 which supplies hydraulic pressure to the press 22.

To start the cycle of section 31, which has a comb-feeding transfer bar 173 (Fig. 1), an operator closes a main starting and stopping momentary switch 161 (Fig. 4) to close a circuit through contacts 171 of relay 172, the contacts 67 and 68 of relay 64, a limit switch 181 which is closed when a door (not shown) of the press 22 is closed, a limit switch 182 which is closed when a door (not shown) of the press 23 is closed, a stopping switch 184, contacts 185 of relay 186, a limit switch 187 closed when the ram of the press 22 is retracted, a limit switch 188 closed when the ram of the press 23 is retracted, contacts 69 of the relay 64, contacts 193 of relay 194, contacts 195 of relay 64, contacts 197 of a transformer relay 198 actuated by lowered pressure in an exhaust line 201 of the degreaser 24, contacts 202 of relay 203 and relay 204 to ground. This operates relay 204 to close holding contacts 205 and contacts 206. The contacts 206 operate solenoid 271 to actuate a clutch in the output of the main cam constant speed motor 116 to turn cams 211 through 218.

The motor 116 first closes cam switch contacts 225 to energize relay 231 through contacts 232 of relay 233 and a limit switch 234 operable when the twister 21 is properly retracted to permit a transfer bar 173 to move the combs one position from left to right, as viewed in Fig. 1. Then, during the cycle, cams 211, 212 and 213 close cam switch contacts 221, 222 and 223 to energize relays 237 and 238 through pressure switches 251 and 252, a normally closed contact 239 of the relay 233, the limit switches 181 and 182, the contacts 68 and 67 of relay 64, contacts 171 of relay 172 to power line conductor 170. The pressure-responsive switches 251 and 252 are located in the hydraulic circuits of the presses 22 and 23 for the purpose of insuring that there is sufficient hydraulic pressures in the pressure sources of these presses.

The relay 237 closes holding contacts 253 and contacts 254 to a solenoid 255 for actuating the press 22 to move its ram in an actuating stroke. The relay 238 closes contacts 256 in line with a ram-down solenoid 257 of the press 23. When the hydraulic lines of the presses 22 and 23 have reached a predetermined pressure, the pressure opens switches 251 and 252 to return the rams of presses 22 and 23 and drops out relay 238, which opens contacts 256 to drop out retract solenoid 257 and closes pressure switch 261 to energize solenoid 262 to return the ram to its retracted position. The transfer bar moves all the combs in section 31 one position forward in each cycle. Certain features of the transfer bars 173, 174 and 175 of the several sections 31, 32 and 33 are disclosed and claimed in aforementioned copending application Serial No. 446,312 filed July 28, 1954, by E. W. Larsen-B. L. Wright for "Apparatus for Continuous Loading of Articles Into Magazines."

Section 31 will continue to cycle automatically as long as relay 204 is kept energized to keep contacts 206 closed which hold a main cam clutch solenoid 271 energized. The stop switch 184 may be actuated manually to stop the section 31. If a jam occurs on the transfer bar, the parts will close properly located limit switch 272 to energize relay 194 to open contacts 193 which will drop out relay 204. If the locking bars of presses 22 and 23 are not closed, limit switches 181 and 182 open to drop out relay 204 which drops out clutch solenoid 271.

The relay 204 is held in for one cycle by cam 218 and contact 278 operated thereby. This occurs by press 22 opening limit switch 187 at the beginning of its down stroke, and the contacts 278 close just before this occurs and open just after the switch 187 is closed on retraction of the ram to its fully retracted position. If the ram of either press 22 or press 23 does not fully retract to close switches 187 and 188 when the contacts 278 are opened, the relay 204 is dropped out to stop section 31.

The twister unit 21 is actuated by the transfer bar, which closes limit switch 281 to energize feed solenoid 282 controlling a pneumatic feed of the twister. The twister moves to its forward position and opens switch 281 and closes switch 283 to energize return solenoid 284. On the retraction of the twister, it opens limit switch 234 to prevent energization of relay 231 to keep clutch solenoid 286 of section 31 deenergized and section 31 will not cycle.

To run section 33 automatically, selector switch 291 (Fig. 3) is moved to its automatic position to energize relays 233 and 292. The relay 233 closes contacts 293 through 297, inclusive, and opens contacts 232 and 239. The relay 292 closes contacts 301, opens contacts 302. Switch 151 is closed momentarily to energize relay 154 which locks itself in through holding contacts 309 and to actuate motor 311 to build up a supply of hydraulic liquid under pressure for the press 26. A manual, momentary switch 312 is closed to actuate relay 313 to close holding contacts 314 and also close contacts 315 to start motor 316 to drive a hydraulic pump (not shown) to provide power for the press 27. A manually operable momentary switch 321 (Fig. 2) is closed to energize relay 322 to close holding contacts 323 (Fig. 3) and contacts 324 to energize a motor 325 which drives a hydraulic pump (not shown) to provide power for the press 28. The operator also closes momentary switch 331 to energize relay 332 to close holding contacts 333 and contacts 334 to energize a drive motor 335 which supplies power to the transfer bar 175 of the section 33.

To start the cycle of the section 33, the operator closes switch 161 (Fig. 4) to energize the relay 204 through contacts 87 of relay 81, contacts 294 of relay 233, limit switches 341, 342 and 343 closed by control cabinet doors of the presses 26, 27 and 28 being closed, contacts 295 of the relay 233, the switch 161, contact 185 of relay 186, contact 296 of relay 233, limit switches 344, 345 and 346 closed by the rams of the presses 26, 27 and 28, respectively, being fully retracted, the contacts 297 of relay 233, normally closed contacts 347 of relay 348, the contacts 197 of relay 198 operable by the exhaust line and contacts 202 of relay 203. The relay 204 is energized to close holding contacts 205 and contacts 206 to actuate the main cam clutch solenoid 271 to drive the cams 211—218. During the rotation of these cams, the cam 216 closes contacts 361 to energize relay 362 to close contacts 363 to energize clutch solenoid 364 to drive transfer bar 175 of the section 33 from previously energized motor 335. The transfer bar 175 moves the combs one position to the right, as viewed in Fig. 1. The cams 213 and 214 close contacts 223 and 365 to energize relays 371, 372 and 373 through pressure switches 374, 375 and 376. The relay 371 closes contacts 377 and holding contact 379 to energize solenoid 378 of the press 76 to start the feed stroke of the ram thereof. The relay 372 closes contact 381 to energize a retract solenoid 382 of the press 27, and the relay 373 closes contact 383 to energize a retract solenoid 384 of the press 28. When the ram of the press 26 is fully down, the hydraulic pressure builds up to open pressure responsive switch 374 to drop out the relay 371 and solenoid 378 to return the ram of the press 26 to a retracted position. Similarly, at the end of the working strokes of the rams of presses 27 and 28, pressures build up to open switches 375 and 376 to drop out relays 372 and 373 to open contacts 381 and 383 which drop out solenoids 382 and 384. Also, the pressures in the hydraulic lines of the presses 27 and 28 close pressure-responsive switches 385 and 386 to energize solenoids 387 and 388 to return the rams of the presses 27 and 28 to retracted positions. Then the cycle repeats itself until the operator opens switch 184 or a jam on the conveyor or transfer bar portion of section 33 occurs to close limit switch 391. This energizes relay 348 to open contacts 347 which drops out relay 204 and clutch solenoid 207.

Automatic operation of section 32 only

The selector switch 84 (Fig. 2) is turned to "automatic" to energize relay 83, and momentary switch 401 is closed to energize a relay 402 which locks in through contacts 403. Relay 402 also closes contacts 404 to energize relay 406 and closes contacts 405 to start a five-minute, filament-warmup timer 407 and a filament transformer 412 for heating filaments of vacuum tubes. The relay 406 closes contacts 408 and 409 to filament transformers 410 and 411 of the welders 24 and 25. After five minutes delay, the timer 407 closes contacts 415, and the operator closes "high voltage" switch 416 to energize relay 417 through closed cabinet door switch 418, a stop switch 419, contacts 420 of the switch 84 and contacts 415 of the timer 407. The relay 417 closes holding contacts 425, contacts 426 to a welding circuit power supply 427 and contacts 428 to shorting bar solenoids 429 and 430. The closing of contacts 426 also starts a ten-second timer 431 through contacts 433 of relay 434. After ten seconds, the timer 431 closes contacts 435 to energize contactor relay 436, which closes contacts 437 and 438 to a welder motor 440 and holding contacts 439.

The operator then closes switch 443 to energize relay 444 through contacts 445 of relay 83, contacts 447 of relay 81, contacts 448 of relay 172, contacts 449 of relay 450, the switch 443, stop switch 451, contacts 452 of relay 434, and contacts 446 of relay 203. The relay 444 closes holding contacts 455 and also closes contacts 456 to a clutch solenoid 457 to drive the transfer bar 174 of section 32 and also drive cams 458 and 459 from the welder motor 440. The cams 458 and 459 close contacts 460 and 461 during the cycle to trip welding circuits 412 and 413 to effect welds of contacts (not shown) to wires of the combs.

Limit switches 471 and 472 are actuated by the absence of combs in the welders 24 and 25, respectively, and actuate relays 473 and 474. Whenever the relay 473 is actuated, it closes contacts 475 to energize solenoid 477 through line 484 and opens contacts 476 to shut off welding power to the welder 24. Similarly, when actuated, the relay 474 closes contacts 479 to energize solenoid 480 and opens contacts 481 to shut off welding power to the welder 25. The solenoids 477 and 480 stop feed of contact-forming tapes (not shown) in the welders 24 and 25. A manual switch 482 also may be used to stop welding at any time. Welding also will be stopped when switch 451 is pressed open to drop out relay 444 or when a limit switch 483 is closed by a jam in the comb-indexing unit of the welders 24 and 25 and energizes relay 203. The relay 203, when energized, opens contacts 446 to drop out relay 444 to deenergize the clutch solenoid 457. Also, opening of cabinet doors to open limit switch 418, or opening of switch 419, drops out relay 417 to deenergize variac 427 which is the welder power supply and also to deenergize transformer 491 to drop out rectifier 492 supplying power to a control circuit 493 to stop the drive of the welders 24 and 25.

Automatic operation of only sections 31 and 32

Switches 84 and 61 (Figs. 2 and 3) are turned to "automatic" and the operation of section 32 is the same as described hereinabove except for the actuation of the switch 443. After section 32 has warned up, high voltage switch 416 is closed to supply power to the welders, and the switch 443 is closed to start the welder drive; the relay 83 having been energized by the operation of switch 84. The switch 61 had actuated relays 64 and 65. The relay 64 closed contacts 66 to energize relay 81. The relay 81 opened contacts 495 to drop out relay 65 and opened contacts 447 to block out the switch 443. Deenergization of relay 65 opens contacts 76 to drop out relay 498 to keep contacts 499 open. Then the switch 161 is closed to start the first cycle by energizing relay 204 through contacts 202 of relay 203, contacts 197 of relay 198, contacts 195 of relay 64, contacts 193 of relay 194, contacts 69 of relay 64, limit switches 187 and 188, contacts 185 of relay 186, the switch 161, limit switches 181 and 182, contacts 68 of the relay 64, contacts 67 of relay 64 and contacts 171 of relay 172. The sections 31 and 32 operate together in synchronism as previously described for each except that the operation of the solenoid 457 (Fig. 2) now is controlled by operation of the cam 217, which controls the energization of the relay 498, which, in turn, controls the operation of the transfer bar of section 32. The joint operations of sections 31 and 32 is stopped by opening switch 184 and closing switch 483.

Automatic operation of sections 32 and 33 only

The switches 84 and 291 (Fig. 3) are set in their "automatic" positions. The section 32 sets up the same as described hereinabove except that switch 443 is blocked by contact 448 opened by relay 172. The switch 291 energizes relays 233 and 292. The relay 233 energizes relay 172. Relay 172 deenergizes relay 292, and opens contacts 448 to block switch 443 and relay 83 opens contacts 500. The relay 233 opens contacts 232 to block operation of section 31 to block presses 22 and 23. The relay 233 also closes contacts 293, 294, 295, 296 and 297. The switches 84, 151, 312, 321, 331, 111 and 521 are closed and then the operator closes switch 161 to energize the relay 204 through contacts 202, 197, 347 and 297, limit switches 344, 345 and 346, contacts 296 and 185, the switches 184 and 161, contacts 295, limit switches 343, 342 and 341 and contacts 294 and 87. The relay actuates main cam drive clutch solenoid 271 as described hereinabove, and sections 32 and 33 operate as described in the operation of each of these sections alone. The switch 507 actuates relay 508 to start exhaust motor 509.

Automatic operation of sections 31 and 33 only

Switches 61 and 291 are set on "automatic" to bring in relays 64, 65, 233 and 292, which actuate relay 450 to drop out relays 64 and 233 and open contacts 449 to block switch 443 of section 32 and close contacts 505 and 506. Then switches 91, 141, 151, 312, 321, 101, 331, 95 and 507 of the individual components of sections 31 and 33 are closed along with main cam drive switch 111. The operator then starts the sections 31 and 33 by closing switch 161 to energize the relay 204 through contacts 505, 197, 347, 193, the limit switches 346, 345, 344, 188, 187, contacts 185, the switches 184 and 161, limit switches 182, 181, 343, 342 and 341 and contacts 506 and 500. The relay 204 starts the main cam drive clutch solenoid 271 to run the sections 31 and 33, as described hereinabove in the descriptions of the individual operations of these sections.

While sections 31 and 33 are operating together on "automatic," section 32 can be run on "manual" only. This is effected by turning switch 84 on "manual" and closing switch 401 (Fig. 2) to start the warmup timer 407 for the filaments of vacuum tubes in the welders 24 and 25. After the timer 407 times out, the switch 86 is closed to start the welder drive motor 440 by means of the contactor 436, and the relay 436 locks in through contacts 439 thereof. The operator then can push high voltage switch 416 to weld or leave the welding circuits per se deenergized. The operator closes switch 443 to energize relay 444 and energize clutch solenoid 457 and starts the welder to cycle through one cycle, or operation, only, contacts 452 of relay 434 being open to block off the action of holding contacts 455.

Automatic operation of sections 31, 32 and 33

The switches 84, 61, 291 and 521 are placed on "automatic." The individual devices of sections 31, 32 and 33 are then set up as described hereinabove, and relay 83 brings in relay 522 which opens contacts 523 and closes contacts 524. The operator then closes switch 161 to energize relay 204 through the contacts 202, 197, 347, 193, limit switches 346, 345, 344, 188 and 187, contacts 185, switches 184 and 161, limit switches 182, 181, 343, 342 and 341 and the contacts 524 of the relay 522. The entire apparatus or line of sections then operates continuously unless trouble occurs at any of the sections which drop out the relay 204 to stop the operation.

If manual (single cycle) operation of the entire line of the three sections is desired, the switch 521 is moved to "manual" to energize relay 186, which opens contacts 185 to prevent relay 204 from locking in and closes contacts 531 and opens contacts 532 to permit the switch 161 to run the line for one cycle.

When the operative one of the supply magazines of the loader 20 empties, limit switch 600 closes and limit switch 601 closes when the transfer bar 173 moves fully forward. The limit switches 600 and 601 actuate a solenoid 602 to index the loader one position to bring a loaded magazine to the loading position. A manual switch 603 also may be used to index the loader 20. Similarly for the unloader 30, when the operative magazine of the unloader is filled, a limit switch 604 is closed, and, when the transfer bar 175 is all the way forward, a limit switch 605 is closed, a solenoid 606 is energized to index the unloader to bring an empty magazine to the comb-receiving position.

The above-described apparatus is highly flexible in its operation. Any of the sections 31, 32 and 33 may be run individually, may be run automatically in any paired combination and may be run automatically all together. Also, each of the sections may be run individually manually and may be run individually automatically.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. In a control system for a plurality of machine sections in tandem including, means for feeding articles one after another through the sections a control circuit including a timing device having a plurality of switches operable in a predetermined timed sequence, means in said circuit operable by one of the switches for actuating one of the sections, means in said circuit operable by another of the switches for actuating another of the sections selector switch means in said circuit operable for rendering said actuating means selectively inoperable, and means in said circuit operable by defective operation of any of the sections for stopping the timing means.

2. A line apparatus comprising a first section having an article-receiving end and an article-discharging end, a second section having an article-receiving end at the discharging end of the first section and an article-discharging end spaced therefrom, a third section having an article-receiving end at the article-discharging end of the second section and an article-discharging end spaced therefrom, a circuit adapted to control the operation of all three sections of the apparatus, means included in said control circuit for running the first section automatically, means included in said control circuit for running the second section automatically, means included in said control circuit for running the third section automatically, selector switch means in said circuit for actuating the first running means and the second running means for timed operation, selector switch means in said circuit for actuating the second running means and the third running means for timed operation, selector switch means in said circuit for actuating the first running means and the third running means for timed operation, means for manually initiating a single cycle of the first section, means for manually initiating a single cycle of the second section, and means for manually initiating a single cycle of the third section.

3. A multi-section line apparatus comprising a first section having an article-receiving end and an article-discharging end, a second section having an article-receiving end at the discharging end of the first section and an article-discharging end spaced therefrom, a third section having an article-receiving end at the article-discharging end of the second section and an article-discharging end spaced therefrom, a circuit adapted to control the operation of all three of the sections, means in said circuit for running the first section automatically, means in said circuit for running the second section automatically, means in said circuit for running the third section automatically, selector switch means in said circuit for actuating a first relay to energize the first and second running means for timed operation and to prevent the operation of the third running means, selector switch means in said circuit for actuating a second relay to energize the second and third running means for timed operation and to prevent the operation of the first running means, selector switch means in said circuit for actuating a third relay to energize the first and third running means for timed operation and to prevent the operation of the second running means, means for manually initiating a single cycle of the first section, means for manually initiating a single cycle of the second section, and means for manually initiating a single cycle of the third section.

References Cited in the file of this patent
UNITED STATES PATENTS

| | | |
|---|---|---|
| 2,058,498 | Perry | Oct. 27, 1936 |
| 2,709,010 | Todd | May 24, 1955 |
| 2,732,962 | Bullard | Jan. 31, 1956 |